(12) United States Patent
Martin (10) Patent No.: US 11,814,975 B2
(45) Date of Patent: Nov. 14, 2023

(54) FEED CIRCUIT WITH SLOT(S) AT INTERFACE BETWEEN JOURNAL BEARING AND ROTOR

(71) Applicant: Pratt & Whitney Canada Corp., Longueuil (CA)

(72) Inventor: Bruno Martin, Saint-Jean-sur-Richelieu (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 12 days.

(21) Appl. No.: 17/408,029

(22) Filed: Aug. 20, 2021

(65) Prior Publication Data
US 2023/0054545 A1 Feb. 23, 2023

(51) Int. Cl.
F01D 25/16 (2006.01)
F01D 25/18 (2006.01)

(52) U.S. Cl.
CPC .......... F01D 25/166 (2013.01); F01D 25/18 (2013.01); *F05D 2220/32* (2013.01); *F05D 2240/54* (2013.01); *F05D 2260/98* (2013.01)

(58) Field of Classification Search
CPC ........ F16C 17/10–26; F16C 17/00–035; F16C 2240/42; F16C 32/0659; F16H 1/28–48; F16H 57/042–0432; F02C 7/06; F05D 2240/54; F05D 2260/40311
See application file for complete search history.

(56) References Cited

U.S. PATENT DOCUMENTS

| 1,999,266 A | * | 4/1935 | Warlop | F16C 33/106 |
| | | | | 384/292 |
| 2,625,448 A | * | 1/1953 | Underwood | F16C 17/026 |
| | | | | 384/291 |
| 2,901,297 A | * | 8/1959 | Sternlicht | F16C 17/028 |
| | | | | 384/291 |

(Continued)

FOREIGN PATENT DOCUMENTS

| EP | 3159578 A1 | * | 4/2017 | ............. F01D 25/18 |
| EP | 3572690 A1 | * | 11/2019 | ........... F01D 25/162 |

(Continued)

OTHER PUBLICATIONS

EPO Opinion dated Jan. 2, 2023 for corresponding application 22191510.1 (Year: 2023).*

*Primary Examiner* — Topaz L. Elliott
(74) *Attorney, Agent, or Firm* — GETZ BALICH LLC (57) ABSTRACT

An apparatus is provided for a turbine engine. This turbine engine apparatus includes a journal bearing extending axially along and circumferentially about an axis. The journal bearing extends radially between a bearing inner side and a bearing outer side. The journal bearing includes a bore, a passage, a groove and a slot. The bore extends axially within the journal bearing and along the bearing inner side. The passage extends radially within the journal bearing and is fluidly coupled with the bore and the groove. The groove extends longitudinally within the journal bearing at the bearing outer side between a groove first end and a groove second end. At least a portion of the slot extends circum- (Continued)

ferentially about the axis within the journal bearing at the bearing outer side from the groove first end to the groove second end.

17 Claims, 9 Drawing Sheets

(56) References Cited

U.S. PATENT DOCUMENTS

| | | | |
|---|---|---|---|
| 3,837,716 A * | 9/1974 | Allen | F16C 32/0659 |
| | | | 384/112 |
| 6,176,621 B1 * | 1/2001 | Naitoh | F16C 33/1065 |
| | | | 384/291 |
| 8,246,503 B2 | 8/2012 | Sheridan | |
| 8,298,108 B2 | 10/2012 | Nishida | |
| 8,777,793 B2 | 7/2014 | Sheridan | |
| 8,894,529 B2 | 11/2014 | McCune | |
| 8,900,083 B2 | 12/2014 | Sheridan | |
| 10,234,018 B2 | 3/2019 | Hasting | |
| 10,662,879 B2 | 5/2020 | Desjardins | |
| 10,760,677 B2 | 9/2020 | Brillon | |
| 10,935,076 B2 | 3/2021 | Martin | |
| 2008/0112658 A1 * | 5/2008 | Justin | F16C 33/102 |
| | | | 384/107 |
| 2012/0294558 A1 * | 11/2012 | Ovares | F16C 9/02 |
| | | | 384/288 |
| 2016/0356308 A1 * | 12/2016 | Kessler | F16C 33/1065 |
| 2017/0009810 A1 * | 1/2017 | Futae | F16C 17/18 |
| 2017/0328404 A1 * | 11/2017 | Morreale | F16C 17/02 |
| 2018/0187765 A1 * | 7/2018 | Narayan | F16C 11/10 |
| 2019/0234509 A1 | 8/2019 | Desjardins | |
| 2019/0293026 A1 * | 9/2019 | Uhkoetter | F16H 57/043 |
| 2020/0300340 A1 | 9/2020 | Desjardins | |
| 2020/0347882 A1 * | 11/2020 | Martin | F16H 57/043 |

FOREIGN PATENT DOCUMENTS

| | | | | |
|---|---|---|---|---|
| JP | S6018616 A * | 1/1985 | | F03D 15/00 |
| WO | WO-2014130662 A1 * | 8/2014 | | F01D 25/16 |
| WO | WO-2021063437 A1 * | 4/2021 | | F03D 15/00 |
| WO | WO-2022043123 A1 * | 3/2022 | | |

* cited by examiner

FEED CIRCUIT WITH SLOT(S) AT INTERFACE BETWEEN JOURNAL BEARING AND ROTOR

TECHNICAL FIELD

This disclosure relates generally to rotational equipment and, more particularly, to lubrication between a journal bearing and a rotor.

BACKGROUND INFORMATION

Rotational equipment such as a gas turbine engine may include a journal bearing for rotatably supporting a rotor. Various journal bearing configurations are known in the art. While these known journal bearing configurations have various benefits, there is still room in the art for improvement.

SUMMARY

According to an aspect of the present disclosure, an apparatus is provided for a turbine engine. This turbine engine apparatus includes a journal bearing extending axially along and circumferentially about an axis. The journal bearing extends radially between a bearing inner side and a bearing outer side. The journal bearing includes a bore, a passage, a groove and a slot. The bore extends axially within the journal bearing and along the bearing inner side. The passage extends radially within the journal bearing and is fluidly coupled with the bore and the groove. The groove extends longitudinally within the journal bearing at the bearing outer side between a groove first end and a groove second end. At least a portion of the slot extends circumferentially about the axis within the journal bearing at the bearing outer side from the groove first end to the groove second end.

According to another aspect of the present disclosure, another apparatus is provided for a turbine engine. This turbine engine apparatus includes a journal bearing, a rotor and a lubricant feed circuit. The journal bearing extends axially along and circumferentially about an axis. The rotor is mounted on the journal bearing and rotatable about the axis. The lubricant feed circuit is formed by and extends radially between the journal bearing and the rotor. The lubricant feed circuit includes a groove and a slot. The groove extends longitudinally between a groove first end and a groove second end. At least a portion of the slot extends circumferentially about the axis from the groove first end to the groove second end.

According to still another aspect of the present disclosure, another apparatus is provided for a turbine engine. This turbine engine apparatus includes a journal bearing, a rotor and a lubricant feed circuit. The journal bearing extends axially along and circumferentially about an axis. The journal bearing includes a lubricant supply passage. The rotor is mounted on the journal bearing and rotatable about the axis. The lubricant feed circuit is formed by and extends radially between the journal bearing and the rotor. The lubricant feed circuit includes an annular slot that extends circumferentially around the axis. The annular slot is configured to receive lubricant from an outlet of the lubricant supply passage.

The groove and the slot may be formed in the journal bearing at an outer side of the journal bearing.

2

The groove may be formed in the journal bearing at an outer side of the journal bearing. The slot may be formed in the rotor at an inner side of the rotor.

The slot may be configured as an annular slot.

The slot may be configured as an arcuate slot.

The slot may have a slot axial width. The groove may have a groove axial width that is greater than the slot axial width.

The slot may have a slot radial height. The groove may have a groove radial height that is different than the slot radial height.

The groove may project radially into the journal bearing from the bearing outer side to a groove bottom surface. An outlet from the passage may be formed at the groove bottom surface. The slot may be axially aligned with the outlet.

The groove may project radially into the journal bearing from the bearing outer side to a groove bottom surface. An outlet from the passage may be formed at the groove bottom surface. The slot may be axially displaced from the outlet by an axial distance less than two times a width of the slot.

The groove may extend axially within the journal bearing between a groove first side and a groove second side. The slot may be located at the groove first side or the groove second side.

The groove may extend axially within the journal bearing between a groove first side and a groove second side. The slot may be aligned axially intermediately between the groove first side and the groove second side.

The slot may be a first slot. The journal bearing may include a second slot. At least a portion of the second slot may extend circumferentially about the axis within the journal bearing at the bearing outer side from the groove first end to the groove second end.

The groove may extend axially within the journal bearing between a groove first side and a groove second side. The first slot may be arranged at the groove first side. The second slot may be arranged at the groove second side.

The journal bearing may also include a third slot arranged axially between the first slot and the second slot. At least a portion of the third slot may extend circumferentially about the axis within the journal bearing at the bearing outer side from the groove first end to the groove second end.

The passage may be a first passage. The journal bearing may also include a second passage extending radially within the journal bearing and fluidly coupled with the bore and the groove. The first passage may have a first passage width. The second passage may have a second passage width that is different than the first passage width.

An axial distance between the slot and an axial side of the journal bearing may remain constant as the slot extends circumferentially about the axis.

The apparatus may also include a rotor mounted on and rotatably supported by the journal bearing.

The apparatus may also include an epicyclic geartrain that includes the journal bearing.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
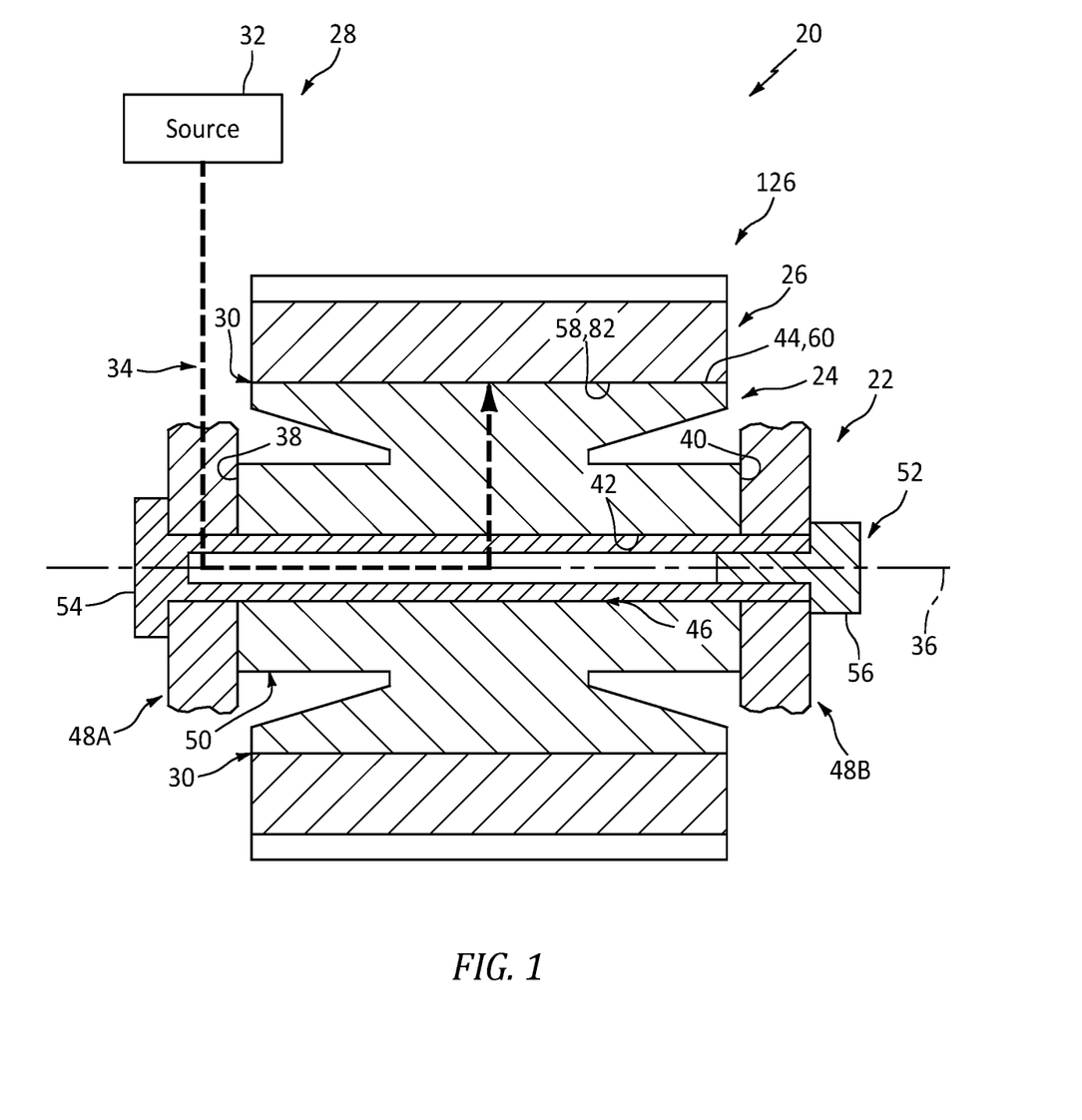
FIG. 1 is a partial side sectional illustration of an apparatus for rotational equipment.

FIG. 1 illustrates an apparatus 20 for rotational equipment. This rotational equipment may be configured as a gas turbine engine for an aircraft propulsion system, an exemplary embodiment of which is described below in further detail (e.g., see FIG. 13). However, the rotational equipment apparatus 20 of the present disclosure is not limited to such an aircraft or gas turbine engine application. The rotational equipment apparatus 20, for example, may alternatively be configured with rotational equipment such as an industrial gas turbine engine, a wind turbine, a water turbine or any other apparatus in which a journal bearing is provided for rotatably supporting a rotor.

The rotational equipment apparatus 20 of FIG. 1 includes a support structure 22, a journal bearing 24 (e.g., a plain bearing) and a rotor 26. The rotational equipment apparatus 20 of FIG. 1 also includes a lubrication system 28 configured to provide lubricant (e.g., oil) to an interface 30 between the rotor 26 and the journal bearing 24. This lubrication system 28 of FIG. 1 includes a lubricant source 32 and a lubricant circuit 34.

The support structure 22 of FIG. 1 is configured to support the journal bearing 24. This support structure 22, for example, may be configured as a carrier for an epicyclic geartrain. This carrier may be a rotating carrier where the epicyclic geartrain is configured as a planetary geartrain. The carrier may be a stationary carrier where the epicyclic geartrain is configured as a star geartrain. The present disclosure, however, is not limited to such exemplary support structure configurations. The support structure 22, for example, may alternatively be configured as a frame, a case or another housing structure.

The journal bearing 24 of FIG. 1 extends axially along a rotational axis 36 of the rotor 26 between and to a first side 38 of the journal bearing 24 and a second side 40 of the journal bearing 24. The journal bearing 24 extends circumferentially about (e.g., completely around) the rotational axis 36, providing the journal bearing 24 with a full-hoop (e.g., tubular) body. The journal bearing 24 extends radially between and to an inner side 42 of the journal bearing 24 and an outer side 44 of the journal bearing 24. The bearing inner side 42 forms an outer peripheral side of an internal bearing bore 46 within the journal bearing 24. This bearing bore 46 extends axially along the rotational axis 36 and the bearing inner side 42 within (e.g., an into and/or through) the journal bearing 24; see also FIGS. 2 and 3.

The journal bearing 24 of FIG. 1 is arranged and spans axially between first and second sections 48A and 48B (generally referred to as "48") of the support structure 22. A base 50 of the journal bearing 24 is mounted to the support structure 22. The bearing base 50 of FIG. 1, for example, is fixedly attached to the first and the second sections 48 by a fastener assembly 52. The fastener assembly 52 of FIG. 1 includes a hollow support pin 54 and a retainer 56 (e.g., a bolt). The present disclosure, however, is not limited to the foregoing exemplary journal bearing fastening technique.

The rotor 26 is configured to rotate about its rotational axis 36. More particularly, the rotor 26 is mounted on and rotatably supported by the journal bearing 24 at the bearing outer side 44. A cylindrical inner surface 58 of the rotor 26, for example, is engaged with (e.g., contacts) and is slidable circumferentially along a cylindrical outer surface 60 of the journal bearing 24, which bearing outer surface 60 is located at the bearing outer side 44. This interface 30 between the rotor inner surface 58 and the bearing outer surface 60 is lubricated with the lubricant provided by the lubrication system 28.

The rotor 26 may be any rotating body within the rotational equipment. The rotor 26, for example, may be a gear such as, but not limited to, an intermediate gear for the epicyclic geartrain. This intermediate gear may be a planet gear where the epicyclic geartrain is configured as the planetary geartrain. The intermediate gear may be a star gear where the epicyclic geartrain is configured as the star geartrain. The present disclosure, however, is not limited to such exemplary rotor configurations. The rotor 26, for example, may alternatively be configured as a wheel, a pulley, a disk, a hub or a shaft.

Figure 2:
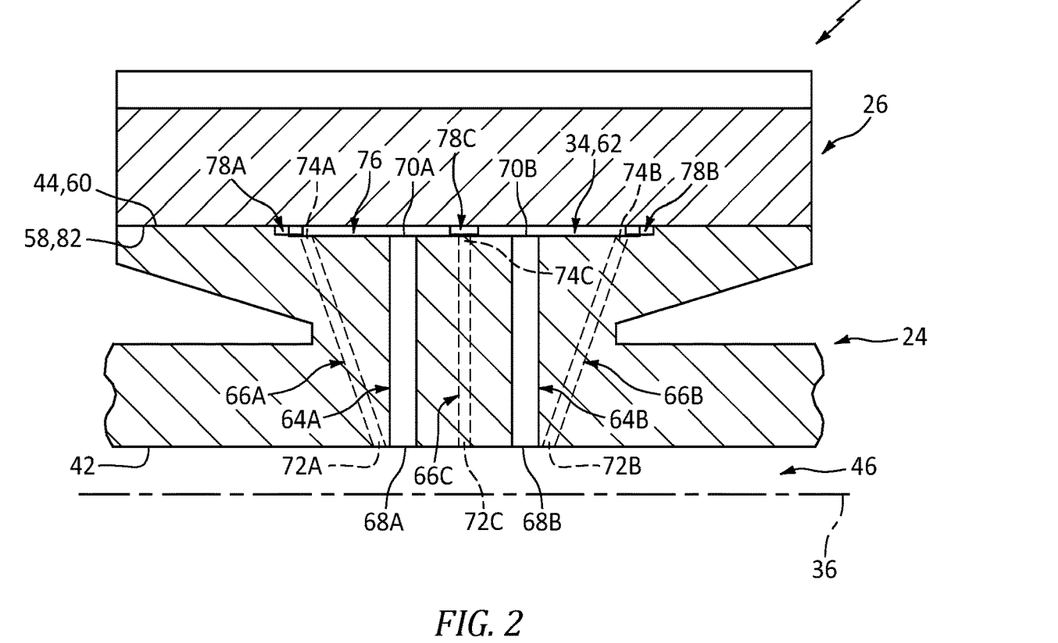
FIG. 2 is a partial side sectional illustration of a rotor mounted on a journal bearing with feed circuit features in the journal bearing.
Figure 3:
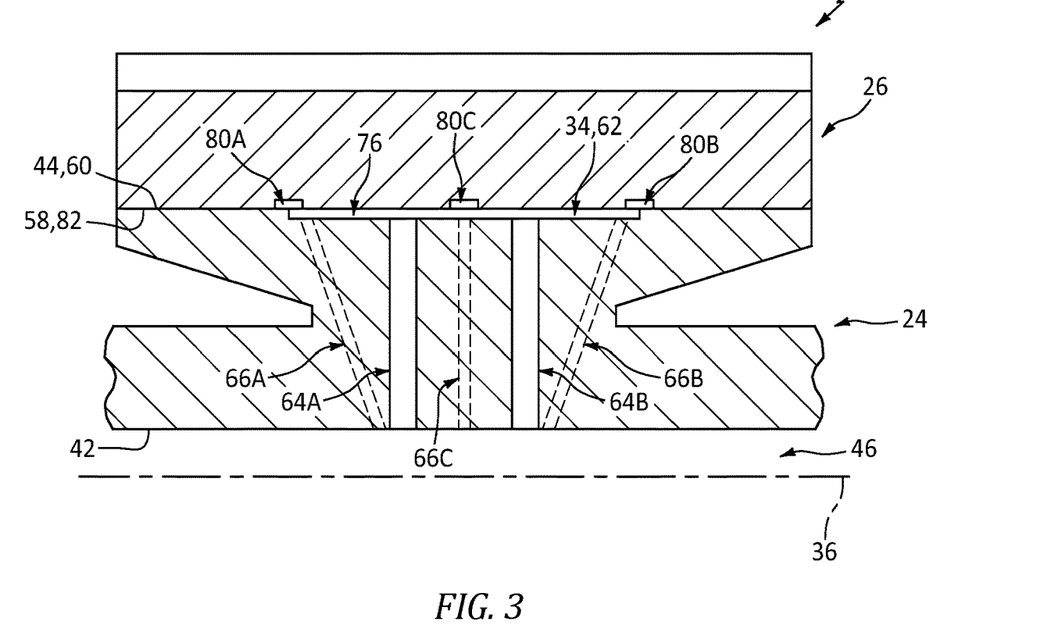
FIG. 3 is a partial side sectional illustration of the rotor mounted on the journal bearing with the feed circuit features in the journal bearing and in the rotor.

Referring to FIG. 2, the lubricant circuit 34 includes a lubricant feed circuit 62 (e.g., an inter-bearing-rotor lubricant circuit) for feeding (e.g., distributing) the lubricant to the interface 30 between the bearing outer surface 60 and the rotor inner surface 58. The lubricant circuit 34 also includes one or more supply passages 64A and 64B (generally referred to as "64") and 66A-C (generally referred to as "66") in the journal bearing 24, which supply passages 64 and 66 are between and fluidly couple the lubricant source 23 (see FIG. 1) and the feed circuit 62. Each of the first supply passages 64A, 64B of FIG. 2 extends radially within (e.g., through) a tubular sidewall of the journal bearing 24 from an inlet 68A, 68B at (e.g., on, adjacent or proximate) the bearing bore 46 to an outlet 70A, 70B at the feed circuit 62. Each of the second supply passages 66A, 66B, 66C of FIG. 2 extends radially within (e.g., through) the tubular sidewall of the journal bearing 24 from an inlet 72A, 72B, 72C at (e.g., on, adjacent or proximate) the bearing bore 46 to an outlet 74A, 74B, 74C at the feed circuit 62.

The feed circuit 62 of FIG. 2 is formed by and extends radially between the journal bearing 24 and the rotor 26 at the interface 30 therebetween. More particularly, the feed circuit 62 of FIG. 2 is formed by a journal bearing groove 76 (e.g., a lubricant flat) and one or more journal bearing slots 78A-C (generally referred to as "78") in the journal bearing 24 at its bearing outer side 44, and the rotor inner surface 58. The present disclosure, however, is not limited to such an exemplary feed circuit configuration. For example, referring to FIG. 3, the feed circuit 62 may alternatively be formed by (a) the bearing groove 76 and the rotor inner surface 58 as well as (b) one or more rotor slots 80A-C (generally referred to as "80") in the rotor 26 at an inner side 82 of the rotor 26, and the bearing outer surface 60. However, for ease of description, the feed circuit 62 is described below with respect to embodiments including the bearing groove 76 and the bearing slots 78 (e.g., see FIG. 2). The teachings below, however, may also be applied to embodiments including the bearing groove 76 and the rotor slots 80 (e.g., see FIG. 3). The rotor slots 80 of FIG. 3, for example, may have a similar or an identical configuration as the bearing slot configurations described below.

Figure 4:
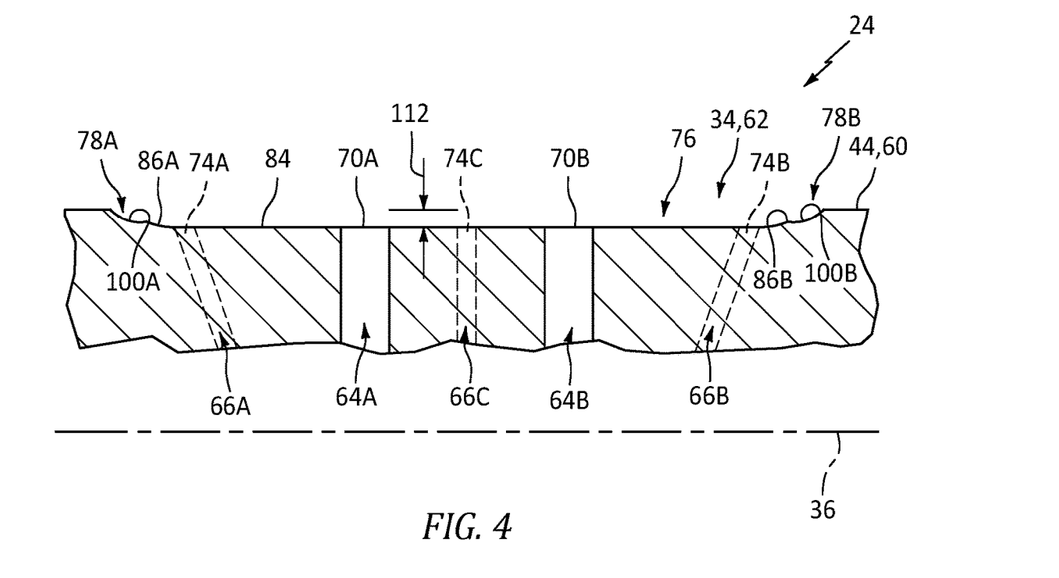
FIG. 4 is a side sectional illustration of a portion of the journal bearing at a groove.
Figure 5:
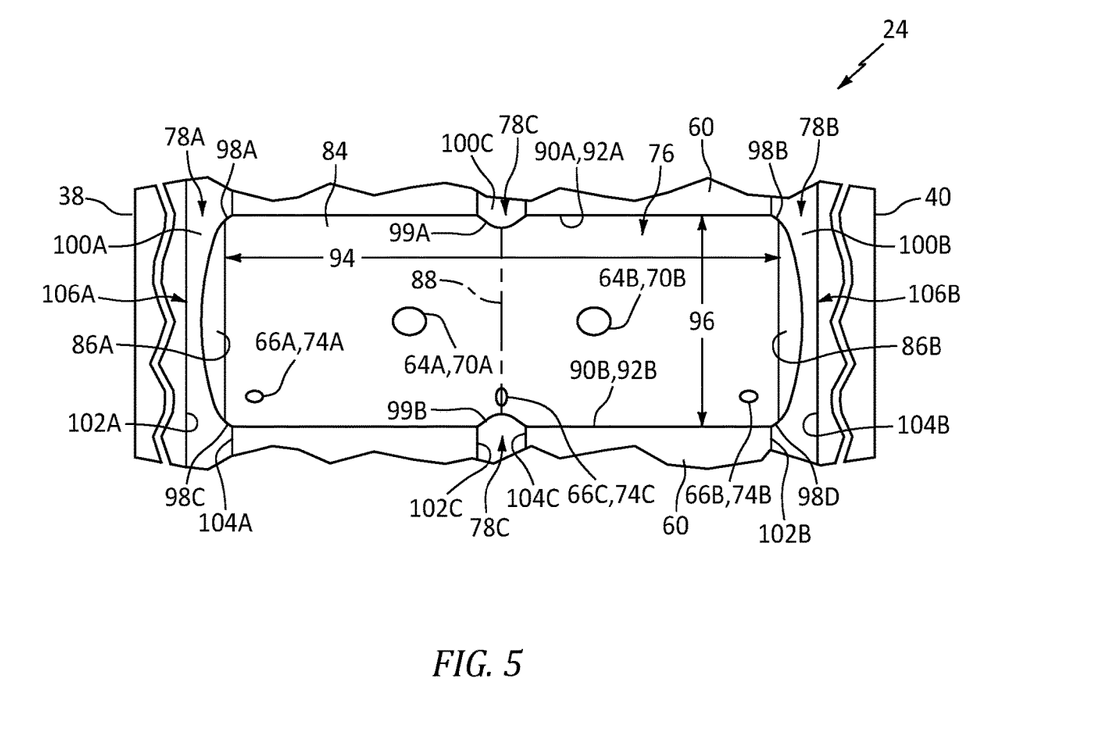
FIG. 5 is an illustration of a side portion of the journal bearing at the groove.

Referring to FIG. 4, the bearing groove 76 projects radially into the journal bearing 24 from the bearing outer surface 60 to a (e.g., curved or flat) groove bottom surface 84 at a radial inner side of the bearing groove 76. The bearing groove 76 extends axially along the rotational axis 36 within the journal bearing 24 between and to axially opposing groove sides 86A and 86B (generally referred to as "86") of the bearing groove 76. Referring to FIG. 5, the bearing groove 76 extends longitudinally along a longitudinal centerline 88 of the bearing groove 76 between and to longitudinally opposing ends 90A and 90B (generally referred to as "90") of the bearing groove 76. This longitudinal centerline 88 may extend circumferentially about the rotational axis 36 and/or generally tangentially to the journal bearing 24 and its bearing outer surface 60. The longitudinal centerline 88 of FIG. 5 is perpendicular to the rotational axis 36; however, the present disclosure is not limited to such an exemplary orientation.

Figure 6:
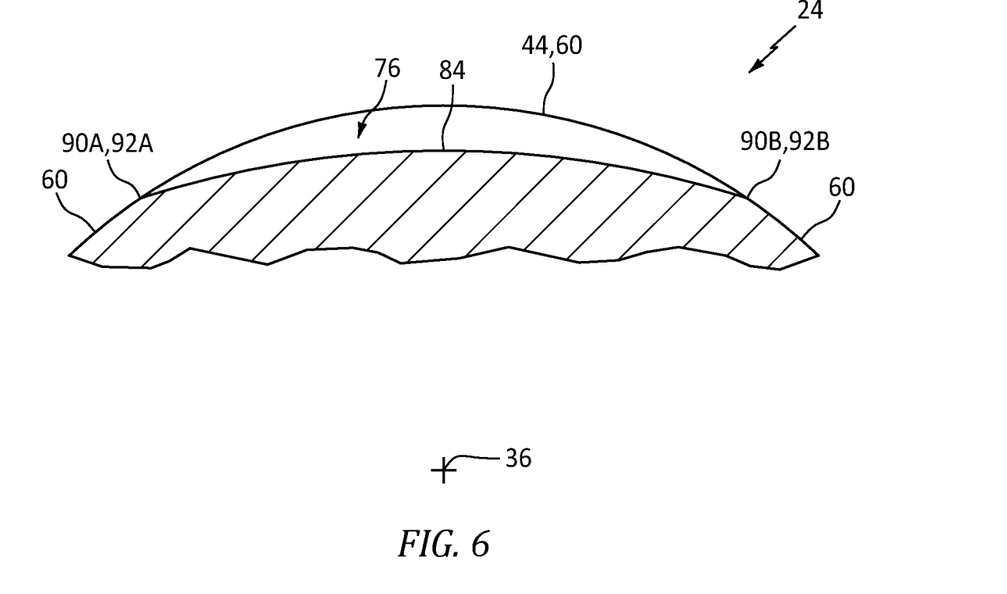
FIG. 6 is a cross-sectional illustration of a portion of the journal bearing at the groove where the groove has a curved bottom surface.
Figure 7:
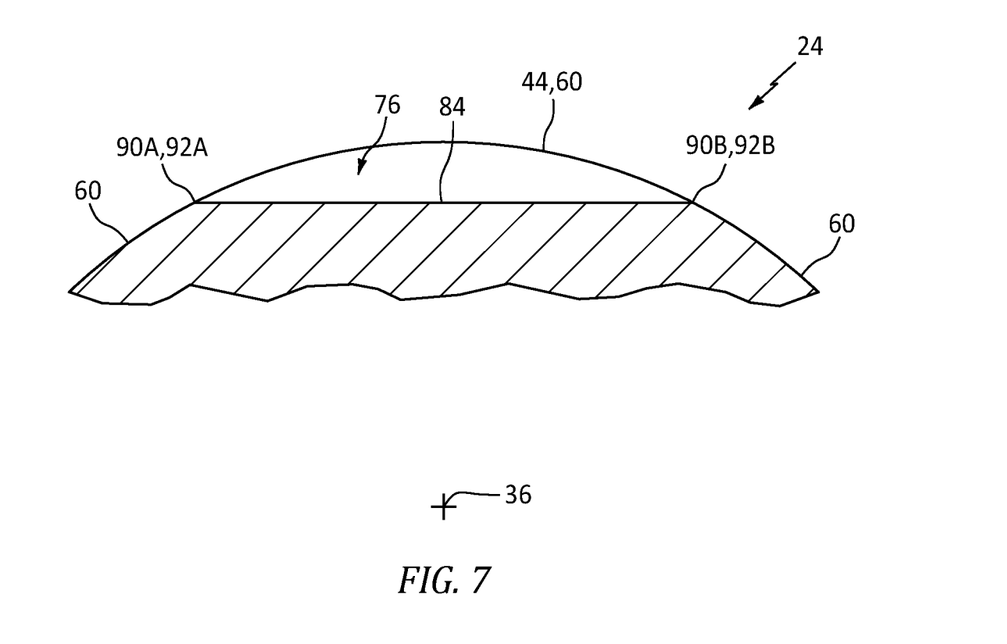
FIG. 7 is a cross-sectional illustration of a portion of the journal bearing at the groove where the groove has a flat bottom surface.

Referring to FIG. 6, the groove bottom surface 84 may meet the bearing outer surface 60 at a respective edge 92A, 92B at each of the groove ends 90. The groove bottom surface 84 may thereby be circumferentially adjacent and/or contiguous with the bearing outer surface 60 at the groove ends 90. The groove bottom surface 84 may be a non-flat surface; e.g., a curved or splined surface. The groove bottom surface 84 of FIG. 6, for example, has a non-straight (e.g., curved or splined) sectional geometry when viewed, for example, in a plane perpendicular to the rotational axis 36. The present disclosure, however, is not limited to such an exemplary groove bottom surface configuration. For example, referring to FIG. 7, the groove bottom surface 84 may be a flat surface. The groove bottom surface 84 of FIG. 7, for example, has a straight sectional geometry when viewed, for example, in a plane perpendicular to the rotational axis 36.

Referring to FIG. 5, the bearing groove 76 and the groove bottom surface 84 have an axial width 94 and a longitudinal length 96. The groove axial width 94 is an axial distance measured between the groove sides 86 at/along the groove bottom surface 84. This groove axial width 94 may remain (e.g., substantially) constant as the bearing groove 76 extends longitudinally along its longitudinal centerline 88 between and to (or about) the groove ends 90. However, at longitudinal interfaces with the bearing slots 78A and 78B, the groove axial width 94 may slightly change. For example, the groove axial width 94 may slightly decrease as the groove bottom surface 84 extends longitudinally to the groove first end 90A where the bearing slots 78A and 78B merge with the bearing groove 76 and cut off (e.g., chamfer) corners of the groove bottom surface 84. The groove axial width 94 may also or alternatively slightly decrease as the groove bottom surface 84 extends longitudinally to the groove second end 90B where the bearing slots 78A and 78B merge with the bearing groove 76 and cut off corners of the groove bottom surface 84. The groove bottom surface 84 of FIG. 5 is thereby provided with one or more chamfered corners 98A-D. The present disclosure, however, is not limited to such an exemplary embodiment.

The groove longitudinal length 96 is a longitudinal (e.g., tangential or circumferential) distance measured between the groove ends 90 at/along the groove bottom surface 84. This groove longitudinal length 96 may remain (e.g., substantially) constant as the bearing groove 76 extends axially along the rotational axis 36 between and to (or about) the groove sides 86. However, at longitudinal interfaces with the bearing slots 78, the groove longitudinal length 96 may slightly change. For example, the groove longitudinal length 96 may slightly decrease as the groove bottom surface 84 extends axially to the groove first side 86A where the bearing slot 78A merges with the bearing groove 76 and cuts off corners of the groove bottom surface 84. The groove longitudinal length 96 may also or alternatively slightly decrease as the groove bottom surface 84 extends axially to the groove second side 86B where the bearing slot 78B merges with the bearing groove 76 and cuts off corners of the groove bottom surface 84. The groove bottom surface 84 of FIG. 5 is thereby provided with the one or more chamfered corners 98A-D. In addition, the groove longitudinal length 96 may also or alternatively slightly decrease and then increase as the groove bottom surface 84 extends axially along an intermediate (e.g., an axial central) region of the journal bearing 24 where the bearing slot 78C merges with the bearing groove 76 and forms one or more notches 99A and 99B in the groove bottom surface 84. The present disclosure, however, is not limited to such an exemplary embodiment.

The groove longitudinal length 96 may be different than the groove axial width 94. The groove longitudinal length 96 of FIG. 5, for example, is less than the groove axial width 94. The present disclosure, however, is not limited to such an exemplary dimensional relationship.

The bearing slots 78 of FIG. 5 are arranged axially along the rotational axis 36. The (e.g., annular) first side bearing slot 78A, for example, is arranged at and/or axially aligned with the groove first side 86A. The (e.g., annular) second side bearing slot 78B is arranged at and/or axially aligned with the groove second side 86B. The (e.g., arcuate) intermediate bearing slot 78C is arranged axially between the first side bearing slot 78A and the second side bearing slot 78B, for example axially aligned with the longitudinal centerline 88. This intermediate bearing slot 78C is also aligned axially intermediately (e.g., centered) between the groove sides 86.

Figure 8:
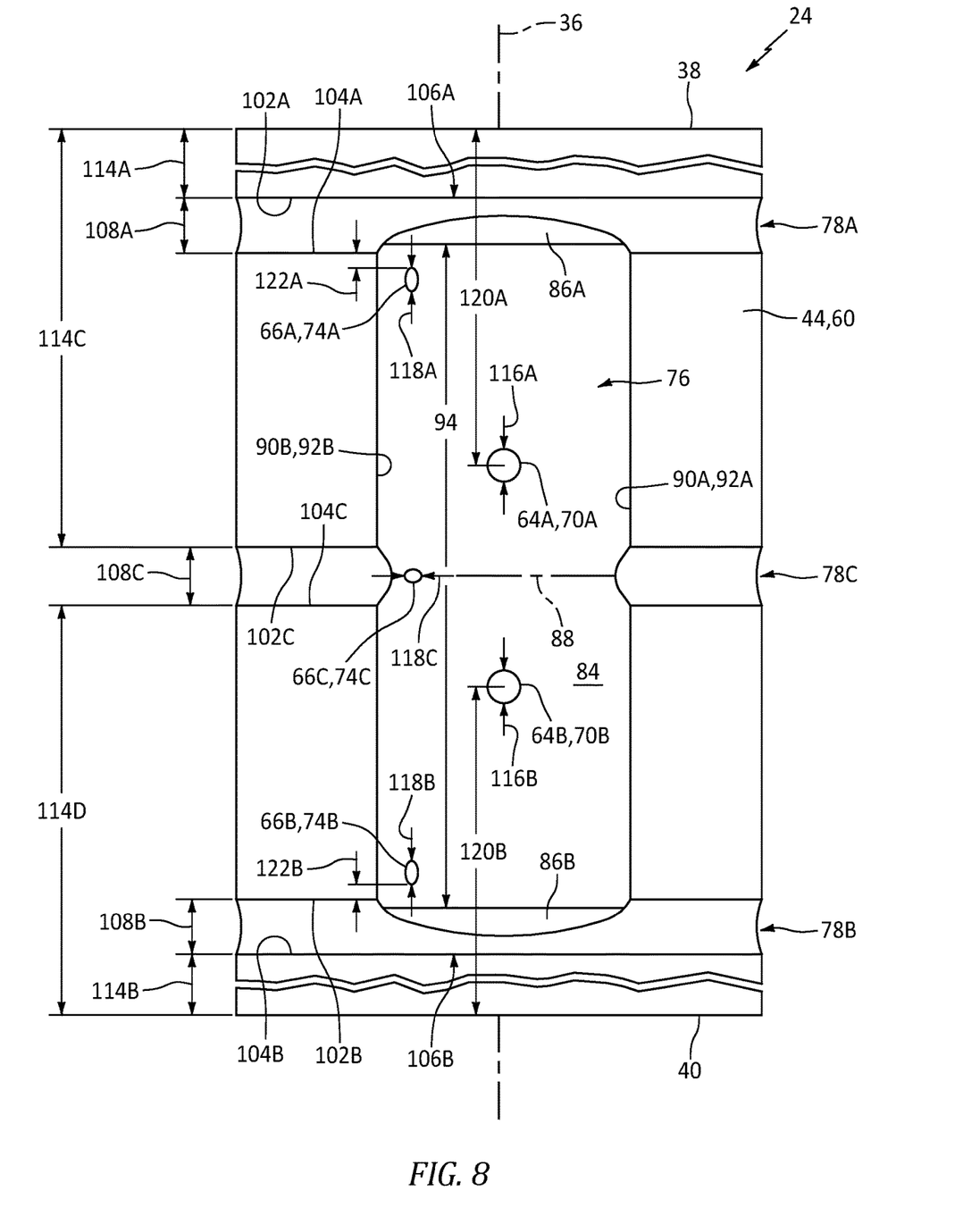
FIG. 8 is a side illustration of the journal bearing.

Referring to FIGS. 4 and 5, each of the bearing slots 78 projects radially into the journal bearing 24 from the bearing outer surface 60 to a respective slot bottom surface 100A, 100B, 100C (generally referred to as "100"). Each of the bearing slots 78A, 78B, 78C extends axially along the rotational axis 36 within the journal bearing 24 between and to axially opposing sides 102A, 102B, 102C (generally referred to as "102") and 104A, 104B, 104C (generally referred to as "104") of the respective bearing slot 78. Referring to FIG. 8, at least a (e.g., major) portion or an entirety of each bearing slot 78 extends circumferentially about the rotational axis 36 within the journal bearing 24 between and to the groove ends 90. A (e.g., minor) portion 106A, 106B of each of the side bearing slots 78A and 78B may also extend circumferentially along the bearing groove 76 at a respective one of the groove sides 86A, 86B. With this arrangement, major portions of the side bearing slots and an entirety of the intermediate bearing slot respectively form arcuate channels in the journal bearing 24 at its bearing outer side 44. The minor portions 106A and 106B of the side bearing slots 78A and 78B respectively form axial extensions to the bearing groove 76 in the journal bearing 24 at its bearing outer side 44.

Each of the bearing slots 78A, 78B, 78C has a respective axial width 108A, 108B, 108C (generally referred to as "108"). This slot axial width 108 is an axial distance measured between the slot sides 102 and 104 at/along the bearing outer surface 60. The slot axial width 108 may remain constant as each slot major portion/intermediate bearing slot 78C extends circumferentially about the rotational axis 36 between and to (or about) the groove ends 90. The slot axial widths 108 may be equal to one another; however, the present disclosure is not limited to such an exemplary dimensional relationship. Each slot axial width 108 of FIG. 8 is different (e.g., less) than the groove axial width 94.

Figure 9:
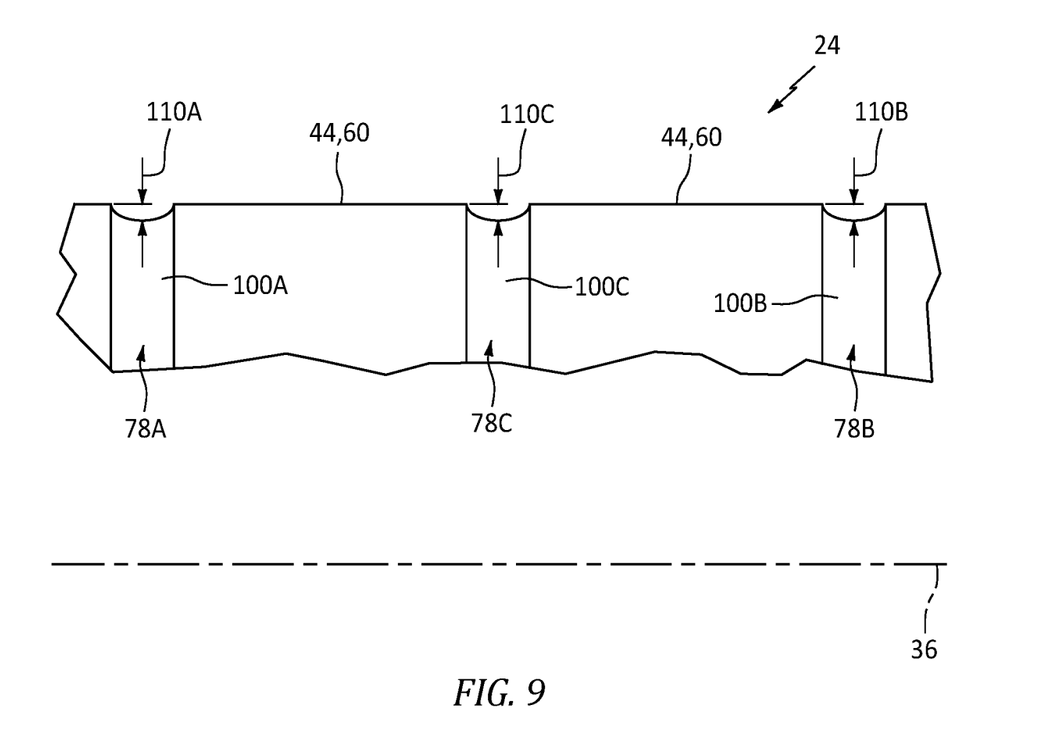
FIG. 9 is a side illustration of a portion of the journal bearing along a plurality of slots.

Referring to FIG. 9, each of the bearing slots 78A, 78B, 78C has a respective radial height 110A, 110B, 110C (generally referred to as "110"). This slot radial height 110 is a radial distance measured radially between the bearing outer surface 60 and (e.g., an apex) of the respective slot bottom surface 100. The slot radial heights 110 may be equal to one another; however, the present disclosure is not limited to such an exemplary dimensional relationship. Each slot radial height 110 of FIG. 9 is different (e.g., less) than a radial height 112 of the bearing groove 76 of FIG. 4. The groove radial height 112 of FIG. 4 is a radial distance measured radially between the bearing outer surface 60 and the groove bottom surface 84.

Referring to FIG. 8, the first side bearing slot 78A is displaced a first axial distance 114A from the bearing first side 38. This first axial distance 114A may be measured between the bearing first side 38 and the first side bearing slot first side 102A. The second side bearing slot 78B is displaced a second axial distance 114B from the bearing second side 40. This second axial distance 114B may be measured between the bearing second side 40 and the second side bearing slot second side 104B. This second axial distance 114B may be equal to the first axial distance 114A. The intermediate bearing slot 78C is displaced a third axial distance 114C from the bearing first side 38, and a fourth axial distance 114D from the bearing second side 40. The third axial distance 114C may be measured between the bearing first side 38 and the intermediate bearing slot first side 102C. The fourth axial distance 114D may be measured between the bearing second side 40 and the intermediate bearing slot second side 104C. This fourth axial distance 114D may be equal to the third axial distance 114C, and is greater than the axial distances 114A and 114B. Each of the axial distances 114A-D may remain constant as the respective bearing slots 78 extend circumferentially about the rotational axis 36 at least between and to the groove ends 90.

Figure 10A:
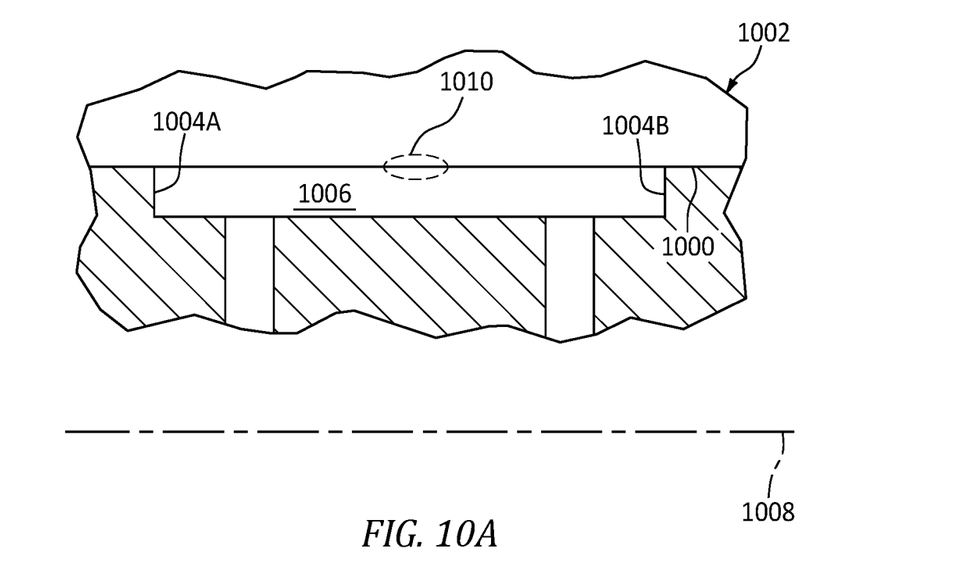
FIG. 10A is a side sectional illustration of another rotor mounted on a journal bearing with a groove in the journal bearing.
Figure 10B:
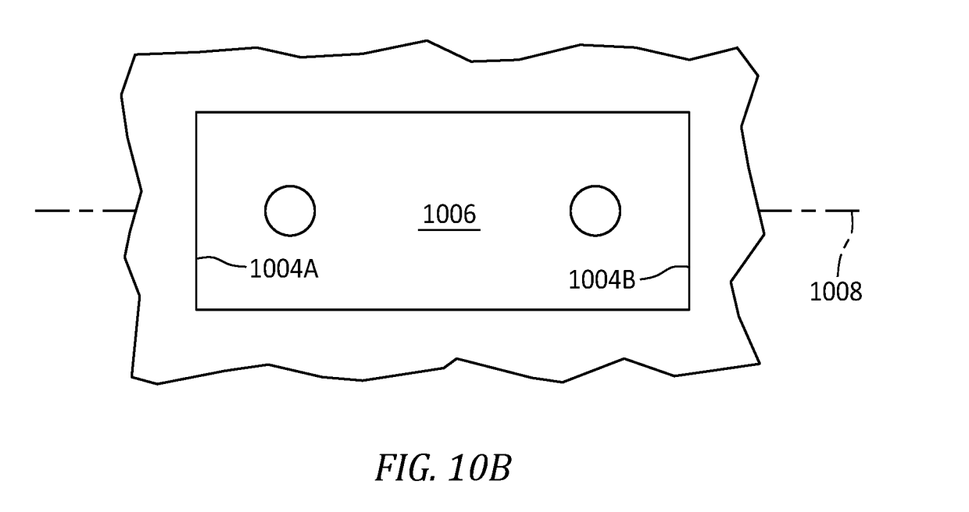
FIG. 10B is an illustration of a side portion of the journal bearing in FIG. 10A at the groove.

During operation of the assembly of FIG. 2, lubricant provided by the lubricant source 23 (see FIG. 1) is directed into the bearing groove 76 through the supply passages 64 and 66. Some of the lubricant within the bearing groove 76 seeps/controllably leaks into a slight radial clearance between the bearing outer surface 60 and the rotor inner surface 58 to lubricate the sliding contact between those surfaces 58 and 60; e.g., provide a thin bearing film between the surfaces 58 and 60. Some of the lubricant within the bearing groove 76 also flow into the respective bearing slots 78. This lubricant flows through the bearing slots 78 to provide a plurality of (e.g., full hoop) rings of lubricant along the journal bearing 24. This lubricant also seeps/controllably leaks into the slight radial clearance between the bearing outer surface 60 and the rotor inner surface 58 to lubricate the sliding contact between those surfaces 58 and 60. Each lubricant ring provides an additional concentration of the lubricant to a select (e.g., annular) regions along an opposing surface (e.g., the rotor inner surface 58). The feed circuit 62 and its bearing slots 78 may be configured such that these select regions overlap and/or otherwise align with regions of the opposing surface (e.g., the rotor inner surface 58) which may otherwise be subject to damage from, for example, lubricant cavitation. The bearing slots 78 may thereby provide additional lubricant to the potential cavitation regions to mitigate effects of and/or prevent generation of bubbles within the lubricant. By contrast, referring to FIGS. 10A and 10B, lubricant cavitation may pit an inner surface 1000 of a rotor 1002 along sides 1004A and 1004B of a bearing groove 1006 where, for example, those groove sides 1004A and 1004B are perpendicular to an axis 1008 of rotation of the rotor 1002. Lubricant cavitation may also or alternatively pit the inner surface 1000 at an intermediate region 1010 between the groove sides 1004A and 1004B.

Referring to FIG. 8, each of the supply passages 64, 66 and its outlet 70, 74 is fluidly coupled with the bearing groove 76. Each of the passage outlets 70, 74 of FIG. 8, for example, is disposed at (e.g., formed in) the groove bottom surface 84. The first supply passages 64 may be configured as primary lubricant passages for the feed circuit 62. The second supply passages 66 may be configured as supplemental lubricant passages for the feed circuit 62. For example, each first supply passage outlet 70A, 70B of FIG. 8 has a lateral first width 116A, 116B (generally referred to as "116") (e.g., diameter, major axis width, etc.) and each second supply passage outlet 74A, 74B, 74C has a lateral second width 118A, 118B, 118C (generally referred to as "118") (e.g., diameter, major axis width, etc.) that is less than the first width 116. The first width 116, for example, may be at least one and one-half times (1.5×), two times (2×) or five times (5×) the second width 118; e.g., up to ten times (10×) the second width. The present disclosure, however, is not limited to the foregoing exemplary dimensional relationship.

The first supply passages 64 and their outlets 70 may be circumferentially aligned about the rotational axis 36. The first supply passages 64 and their outlets 70 are longitudinally intermediate (e.g., centered) between the groove ends 90. The first supply passages 64 of FIG. 8 and their outlets 70 are arranged axially between the groove sides 86. The first supply passages 64 and their outlets 70 are axially displaced from one another along the rotational axis 36.

The first supply passage 64A and its outlet 70A are axially displaced from the bearing first side 38 by a fifth axial distance 120A. This fifth axial distance 120A may be measured between the bearing first side 38 and a center of the first supply passage outlet 70A.

The first supply passage 64B and its outlet 70B are axially displaced from the bearing second side 40 by a sixth axial distance 120B. This sixth axial distance 120B may be measured between the bearing second side 40 and a center of the first supply passage outlet 70B. The sixth axial distance 120B may be equal to the fifth axial distance 120A.

The second supply passages 66A, 66B and 66C and their outlets 74A, 74B and 74C are respectively arranged proximate the bearing slots 78A, 78B and 78C to provide supplemental lubricant to those bearing slots 78. The second supply passages 66 and their outlets 74 may be circumferentially aligned about the rotational axis 36. The second supply passages 66 and their outlets 74 are longitudinally intermediate between the first supply passage outlets 70 and the groove second end 90B; e.g., proximate the groove second end 90B. The second supply passages 66 of FIG. 8 and their outlets 74 are arranged axially between the groove sides 86.

The second supply passage 66A and its outlet 74A are aligned axially between the groove first side 86A and the first supply passage outlet 70A. The second supply passage 66A and its outlet 74A are axially displaced from the first side bearing slot 78A by a seventh axial distance 122A. This seventh axial distance 122A may be measured between the first side bearing slot second side 104A and a (e.g., axially) closest side of the second supply passage outlet 74A. The seventh axial distance 122A may be less than five times (5×), two times (2×) or one time (1×) the (e.g., axial) width 118A of the second supply passage outlet 74A. The present disclosure, however, is not limited such an exemplary dimensional relationship.

The second supply passage 66B and its outlet 74B are aligned axially between the groove second side 86B and the first supply passage outlet 70B. The second supply passage 66B and its outlet 74B are axially displaced from the second side bearing slot 78B by an eighth axial distance 122B. This eighth axial distance 122B may be measured between the second side bearing slot first side 102B and a (e.g., axially) closest side of the second supply passage outlet 74B. The eighth axial distance 122B may be less than five times (5×), two times (2×) or one time (1×) the (e.g., axial) width 118B of the second supply passage outlet 70B. This eighth axial distance 122B may be equal to or different than the seventh axial distance 112A. The present disclosure, however, is not limited such an exemplary dimensional relationship.

The second supply passage 66C and its outlet 74C are aligned axially intermediately (e.g., centered) between the first supply passage outlets 70A and 70B and/or the second supply passage outlets 74A and 74B. A center of the second supply passage outlet 74C of FIG. 8, for example, is axially aligned with the longitudinal centerline 88 and/or (e.g., a centerline of) the intermediate bearing slot 78C.

Figure 11:
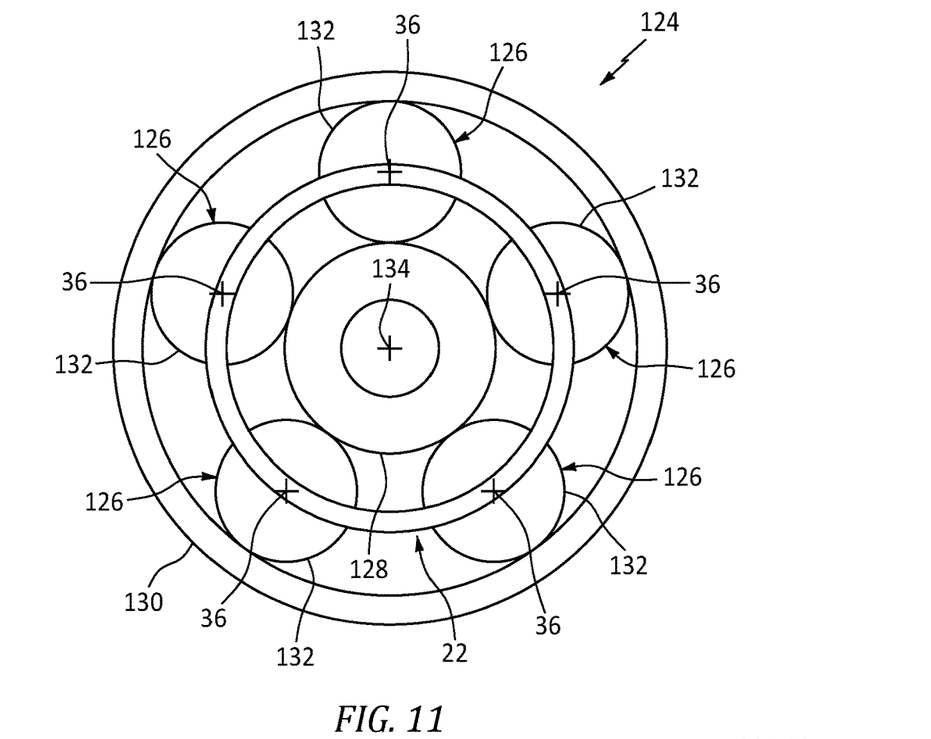
FIG. 11 is a schematic illustration of an epicyclic geartrain.

FIG. 11 illustrates an epicyclic geartrain 124 with which the rotational equipment apparatus 20 may be included. This epicyclic geartrain 124 includes the support structure 22 and a plurality of rotor assemblies 126, where each of the rotor assembly 126 of FIG. 1 includes a respective rotor 26 and a respective journal bearing 24. The epicyclic geartrain 124 of FIG. 11 also includes a center gear 128 (e.g., a sun gear) and a ring gear 130. Here, each rotor 26 of FIG. 1 is configured as and referred to below as an intermediate gear 132 (e.g., a planet or star gear). The intermediate gears 132 of FIG. 11 are distributed circumferentially about and meshed with the center gear 128, which center gear 128 is rotatable about an axial centerline 134. The ring gear 130 circumscribes and is meshed with the intermediate gears 132, which ring gear 130 of FIG. 11 is coaxial with (and may be rotatable about) the axial centerline 134. Where the epicyclic geartrain 124 is configured as a planetary geartrain, the center gear 128 may be coupled to an input (e.g., an input shaft) and the support structure 22 (e.g., a carrier) may be coupled to an output (e.g., an output shaft). Where the epicyclic geartrain 124 is configured as a star geartrain, the center gear 128 may be coupled to the input and the ring gear 130 may be coupled to the output. Of course, the input and the output may be reversed depending upon the desired speed differential.

Figure 12:
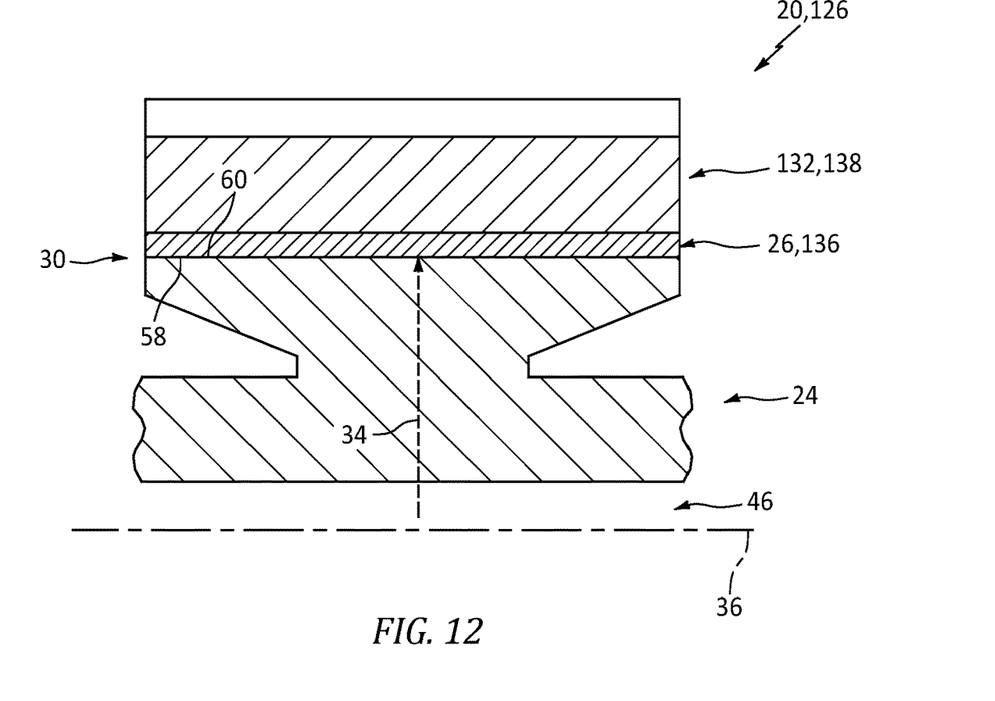
FIG. 12 is a side sectional illustration of a portion of the rotational equipment apparatus where the rotor is configured as a sleeve between the journal bearing and another rotating element.

Each intermediate gear 132 is described above as being configured as a respective rotor 26. In other embodiments however, referring to FIG. 12, the rotor 26 may be configured as a (e.g., wear) sleeve 136 (e.g., a bushing) between a rotating element 138 (e.g., the intermediate gear 132) and the journal bearing 24. In such embodiments, the rotor 26 (e.g., the sleeve 136) may be fixedly attached (e.g., press fit, bonded, etc.) to the rotating element 138 such that the rotor 26 rotates with the rotating element 138.

Figure 13:
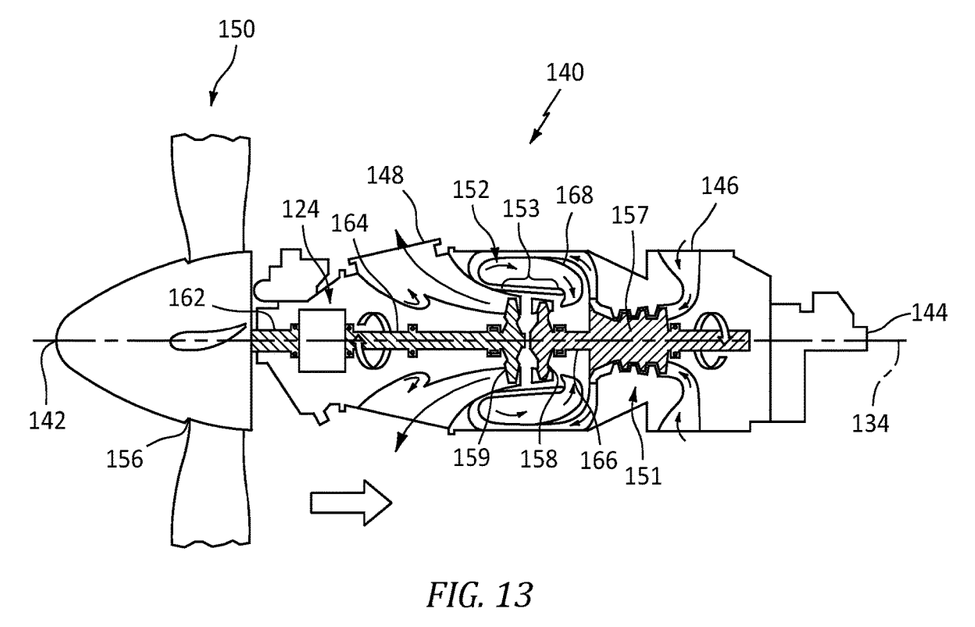
FIG. 13 is a schematic illustration of a turboprop gas turbine engine.

FIG. 13 illustrates an example of the turbine engine with which the rotational equipment apparatus 20 may be configured. This turbine engine is configured as a turboprop gas turbine engine 140. This turbine engine 140 of FIG. 13 extends axially along the axial centerline 134 between a forward end 142 of the turbine engine 140 and an aft end 144 of the turbine engine 140. The turbine engine 140 of FIG. 13 includes an airflow inlet 146, an exhaust 148, a propulsor (e.g., a propeller) section 150, a compressor section 151, a combustion section 152 and a turbine section 153.

The airflow inlet 146 is towards the engine aft end 144, and aft of the turbine engine sections 150-153. The exhaust 148 is located towards the engine forward end 142, and axially between the propulsor section 150 and the turbine engine sections 151-153.

The propulsor section 150 includes a propulsor rotor 156; e.g., a propeller. The compressor section 151 includes a compressor rotor 157. The turbine section 153 includes a high pressure turbine (HPT) rotor 158 and a low pressure turbine (LPT) rotor 159, where the LPT rotor 159 may be referred to as a power turbine rotor and/or a free turbine rotor. Each of these turbine engine rotors 156-159 includes a plurality of rotor blades arranged circumferentially about and connected to one or more respective rotor disks or hubs.

The propulsor rotor 156 of FIG. 13 is connected to the LPT rotor 159 sequentially through a propulsor shaft 162, a geartrain (e.g., a transmission) and a low speed shaft 164, where the geartrain may be configured as the epicyclic geartrain 124 of FIG. 11. The compressor rotor 157 is connected to the HPT rotor 158 through a high speed shaft 166.

During turbine engine operation, air enters the turbine engine 140 through the airflow inlet 146. This air is directed into a core flowpath which extends sequentially from the airflow inlet 146, through the engine sections 151-153 (e.g., an engine core), to the exhaust 148. The air within this core flowpath may be referred to as "core air".

The core air is compressed by the compressor rotor 157 and directed into a combustion chamber of a combustor 168 in the combustion section 152. Fuel is injected into the combustion chamber and mixed with the compressed core air to provide a fuel-air mixture. This fuel-air mixture is ignited and combustion products thereof flow through and sequentially cause the HPT rotor 158 and the LPT rotor 159 to rotate. The rotation of the HPT rotor 158 drives rotation of the compressor rotor 157 and, thus, compression of air received from the airflow inlet 146. The rotation of the LPT rotor 159 drives rotation of the propulsor rotor 156, which propels air outside of the turbine engine 140 in an aft direction to provide forward aircraft thrust.

The apparatus 20, 124 may be included in various turbine engines other than the ones described above. The apparatus 20, 124, for example, may be included in a geared turbine engine where a gear train connects one or more shafts to one or more rotors in a fan section, a compressor section and/or any other engine section. Alternatively, the apparatus 20, 124 may be included in a turbine engine configured without a gear train; e.g., a direct drive turbine engine. The turbine engine may be configured with a single spool, with two spools, or with more than two spools. The turbine engine may be configured as a turbofan engine, a turbojet engine, a turboprop engine, a turboshaft engine, a propfan engine, a pusher fan engine, an auxiliary power unit (APU) or any other type of turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for a turbine engine, comprising:
an epicyclic geartrain comprising a journal bearing;
the journal bearing extending axially along and circumferentially about an axis, the journal bearing extending radially between a bearing inner side and a bearing outer side, and the journal bearing including a bore, a passage, a groove and a slot;
the bore extending axially within the journal bearing and along the bearing inner side;
the passage extending radially within the journal bearing and fluidly coupled with the bore and the groove;
the groove extending longitudinally within the journal bearing at the bearing outer side between a groove first end and a groove second end, the groove extending axially within the journal bearing between a groove first side and a groove second side, the groove projecting radially into the journal bearing from the bearing outer side to a groove bottom surface, and an outlet from the passage formed at the groove bottom surface; and
at least a portion of the slot extending circumferentially about the axis within the journal bearing at the bearing outer side from the groove first end to the groove second end, the slot axially aligned with the outlet, and the slot arranged at an intermediate position axially between the groove first side and the groove second side.

2. The apparatus of claim 1, wherein the slot is configured as an arcuate slot.

3. The apparatus of claim 1, wherein
the slot has a slot axial width; and
the groove has a groove axial width that is greater than the slot axial width.

4. The apparatus of claim 1, wherein
the slot has a slot radial height; and
the groove has a groove radial height that is greater than the slot radial height.

5. The apparatus of claim 1, wherein the slot is axially centered between the groove first side and the groove second side.

6. The apparatus of claim 1, wherein
the slot is a first slot, and the journal bearing includes a second slot; and
at least a portion of the second slot extends circumferentially about the axis within the journal bearing at the bearing outer side from the groove first end to the groove second end.

7. The apparatus of claim 6, wherein the second slot is arranged at the groove second side.

8. The apparatus of claim 7, wherein
the journal bearing further includes a third slot;
at least a portion of the third slot extends circumferentially about the axis within the journal bearing at the bearing outer side from the groove first end to the groove second end; and
the third slot is arranged at the groove first side.

9. The apparatus of claim 1, wherein an axial distance between the slot and an axial side of the journal bearing remains constant as the slot extends circumferentially about the axis.

10. The apparatus of claim 1, further comprising a rotor mounted on and rotatably supported by the journal bearing.

11. An apparatus for a turbine engine, comprising:
a journal bearing extending axially along and circumferentially about an axis, the journal bearing extending radially between a bearing inner side and a bearing outer side, and the journal bearing including a bore, a first passage, a second passage, a groove and a slot;
the bore extending axially within the journal bearing and along the bearing inner side;
the first passage extending radially within the journal bearing and fluidly coupled with the bore and the groove, and the first passage having a first passage width;
the second passage extending radially within the journal bearing and fluidly coupled with the bore and the groove, and the second passage having a second passage width that is less than the first passage width;
the groove extending longitudinally within the journal bearing at the bearing outer side between a groove first end and a groove second end;
at least a portion of the slot extending circumferentially about the axis within the journal bearing at the bearing outer side from the groove first end to the groove second end;
the journal bearing further including a third passage, the third passage extending radially within the journal bearing and fluidly coupled with the bore and the groove, and the third passage having a third passage width that is less than the first passage width; and
the first passage arranged axially between the second passage and the third passage.

12. The apparatus of claim 11, wherein
the groove projects radially into the journal bearing from the bearing outside to a groove bottom surface;
a first outlet from the first passage is formed in the groove bottom surface;
a second outlet from the second passage is formed in the groove bottom surface; and
the first outlet is longitudinally offset form the second outlet.

13. The apparatus of claim 11, wherein
the slot is a first slot, and the journal bearing further includes a second slot;
the second slot extends circumferentially about the axis within the journal bearing at the bearing outer side from the groove first end to the groove second end;
a first outlet from the first passage into the groove is axially aligned with the first slot; and a second outlet from the second passage into the groove is disposed axially between the first slot and the second slot.

14. An apparatus for a turbine engine, comprising:

a journal bearing extending axially along and circumferentially about an axis, the journal bearing including a bore, a first passage and a second passage;

a rotor mounted on the journal bearing and rotatable about the axis; and a lubricant feed circuit formed by and extending radially between the journal bearing and the rotor, the lubricant feed circuit including a groove and a slot, the groove extending longitudinally between a groove first end and a groove second end, and at least a portion of the slot extending circumferentially about the axis from the groove first end to the groove second end;

the first passage extending radially within the journal bearing and fluidly coupled with the bore and the groove;

the second passage extending radially within the journal bearing and fluidly coupled with the bore and the groove; and a first outlet from the first passage into the groove axially and longitudinally offset from a second outlet from the second passage into the groove.

15. The apparatus of claim 14, wherein the groove and the slot are formed in the journal bearing at an outer side of the journal bearing.

16. The apparatus of claim 14, wherein the groove is formed in the journal bearing at an outer side of the journal bearing; and the slot is formed in the rotor at an inner side of the rotor.

17. The apparatus of claim 14, wherein a first width of the first outlet is different than a second width of the second outlet.

* * * * *